United States Patent
Romesburg

(10) Patent No.: US 6,301,357 B1
(45) Date of Patent: *Oct. 9, 2001

(54) AC-CENTER CLIPPER FOR NOISE AND ECHO SUPPRESSION IN A COMMUNICATIONS SYSTEM

(75) Inventor: Eric Douglas Romesburg, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/775,797

(22) Filed: Dec. 31, 1996

(51) Int. Cl.⁷ ....................................................... H04B 3/20
(52) U.S. Cl. .............................. 379/406.06; 379/406.01
(58) Field of Search .................................. 379/410, 406, 379/407, 408, 409, 411, 389, 390, 406.01, 406.05, 406.08; 455/422, 426, 439; 375/232

(56) References Cited

U.S. PATENT DOCUMENTS

| | | | |
|---|---|---|---|
| 5,263,019 | * 11/1993 | Chu | 379/406 |
| 5,274,705 | 12/1993 | Younce et al. | 379/410 |
| 5,283,784 | * 2/1994 | Genter | 379/410 |
| 5,559,881 | * 9/1996 | Sih | 379/410 |
| 5,587,998 | * 12/1996 | Velardo, Jr. et al. | 379/410 |
| 5,668,831 | * 9/1997 | Claydon et al. | 375/232 |
| 5,721,771 | * 2/1998 | Higuchi et al. | 379/410 |
| 5,796,819 | * 8/1998 | Romesburg | 379/410 |
| 6,160,886 | * 12/2000 | Romesburg et al. | 379/410 |

* cited by examiner

Primary Examiner—Wing F. Chan
(74) Attorney, Agent, or Firm—Burns, Doane, Swecker & Mathis, L.L.P.

(57) ABSTRACT

An echo and noise suppression device for processing an information signal to suppress unwanted signal components. In an exemplary embodiment, the echo suppression device includes an AC-center clipper having a clipping window with an adjustable window center. A clipping threshold of the AC-center clipper is set to attenuate the unwanted signal components, and the center of the clipping window is varied in accordance with the value of the information signal so that the unwanted components are suppressed even when the information signal contains a significant noise component. In another exemplary embodiment, a mobile radio station is provided including a microphone for receiving a near-end audio input and for producing a near-end audio output which is to be transmitted to a far-end user. The exemplary mobile station also includes a loudspeaker for broadcasting, to a near-end user of the mobile station, a far-end audio signal which is generated by the far-end user and then received at the mobile station. An echo suppression circuit within the mobile station is used to attenuate an echo component of the near-end audio signal which results from the mobile station microphone receiving output from the mobile station loudspeaker. The echo suppression circuit includes an AC-center clipper having a clipping window with an adjustable clipping center.

41 Claims, 9 Drawing Sheets

AC-CENTER CLIPPER FOR NOISE AND ECHO SUPPRESSION IN A COMMUNICATIONS SYSTEM

BACKGROUND

The present invention relates to communications systems, and more particularly, to echo and noise suppression in a bi-directional communications link.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the lin to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective. Furthermore, if the round-trip gain of a near-end microphone is greater than unity at any aiblq frequency, then the system will tend to "howl" as is well known in the art.

Therefore, in order to avoid transmission of such undesirable echo signals, microphone input should be isolated from loudspeaker output. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which a microphone and a loudspeaker may be situated physically close to one another, yet relatively far away from the user. As a result, the need for more sophisticated echo suppression techniques has become paramount in modern systems.

The need is particularly pronounced in the case of hands-free automobile telephones, where the closed vehicular environment can cause multiple reflections of a loudspeaker signal to be coupled back to a high-gain hands-free microphone. Movement of the vehicle and changes in the relative directions and strengths of the user and echo signals, for example as windows are opened and closed or as the user moves his head while driving, further complicate the task of echo suppression in the automobile environment. Additionally, more recently developed digital telephones process speech signals through vocoders which introduce significant signal delays and create non-linear signal distortions. As is well known, these prolonged delays tend to magnify the problem of signal echo from a user perspective, and the additional non-linear distortions can make echo suppression difficult.

Traditionally, echo suppression has been accomplished using echo canceling circuits designed to approximate and remove echo signals from microphone output so that only near-end speech is transmitted over the communications link. These systems are described, for example, in U.S. Pat. No. 5,475,731, which is incorporated herein by reference. While the systems described in the cited reference are generally effective in suppressing echo signals, certain aspects of those systems make them impractical in some contexts. For example, as is described in more detail below, residual echo suppression circuits within such systems may be relatively ineffective when ambient noise arises at the microphone input. Ambient noise is commonplace and may occur, for example, due to road and traffic noise in the case of an automobile telephone. Therefore, it would be advantageous if a system were available in which all of the echo suppression features of the system could function effectively even in the presence of ambient noise.

Additionally, certain aspects of available systems are not well suited for double-talk situations in which a near-end user and a far-end user are speaking simultaneously. For example, because residual echo suppression circuits within available systems may intolerably distort near-end signals from a far-end-user perspective, they are typically deactivated during double-talk situations. By deactivating all or part of the echo suppression features, however, a conventional system may be susceptible to other problems. For example, as is described in more detail below, the echo suppression provided by a conventional system employing a adaptive-filter echo canceler may be insufficient, absent residual echo suppression, due to non-linearities introduced by the components used to process information signals. Thus, it would be advantageous if a system were available in which all of the echo suppression aspects of the system could be used even during double-talk situations. In sum, there is a real need for an improved technique for suppressing echo signals in a two-way communications link.

SUMMARY

The present invention fulfills the above-described and other needs by providing an echo suppression device for processing an input signal containing a time-varying primary component and a time-varying secondary component to produce an output signal in which the time-varying secondary component is substantially suppressed. In an exemplary embodiment, the echo suppression device includes an input node for receiving the input signal, and a center clipper connected to the input node for processing the input signal to produce the output signal. The center clipper employs a clipping window having a variable center and a clipping threshold which is set to attenuate the secondary component of the input signal.

In another exemplary embodiment, a mobile station includes a microphone for receiving a near-end audio input and for producing a near-end audio output which is to be transmitted to a far-end user. The exemplary mobile station also includes a loudspeaker for broadcasting, to a near-end user of the mobile station, a far-end audio signal which is generated by the far-end user and received at the mobile station. In the mobile station, an echo suppression circuit is used to attenuate an echo component of the near-end audio signal resulting from the microphone receiving output from the loudspeaker. The echo suppression circuit includes an AC-center clipper having a clipping window with an adjustable clipping center.

The above described and additional features of the present invention are explained in greater detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION

Figure 1:
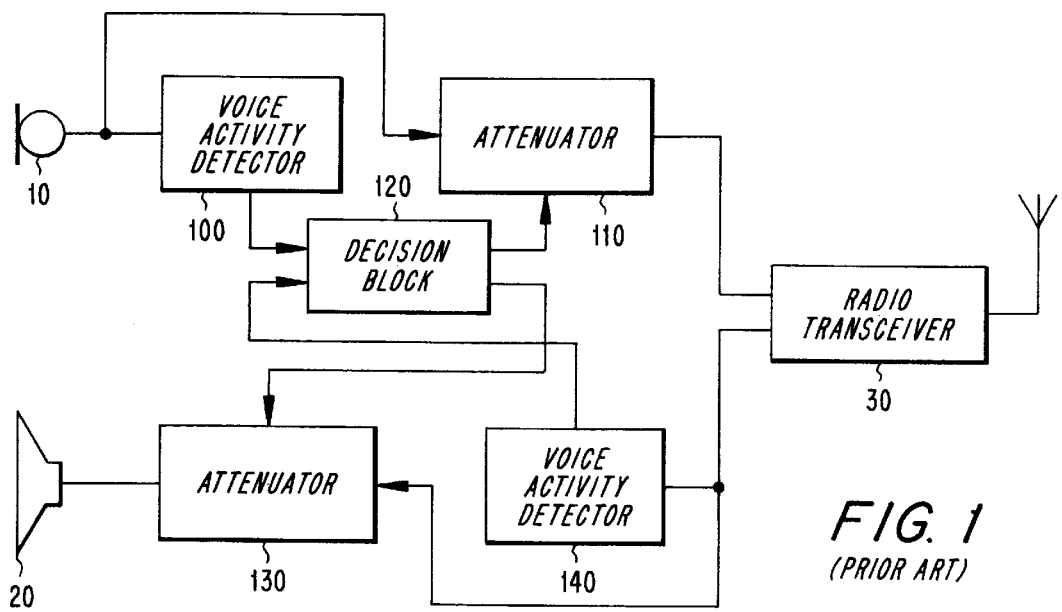
FIG. 1 depicts a conventional echo suppression circuit.

FIG. 1 depicts a conventional echo suppression circuit implemented, for example, in a mobile station in a cellular radio communications system. As shown in FIG. 1, a radio transceiver 30 is connected to an antenna for receiving and transmitting information signals to and from the mobile station, respectively. In the receive path, the radio transceiver 30 is connected to a voice activity detector 140 which is in turn connected to an attenuator 130. An output of the attenuator 130 is connected to a loudspeaker 20. In the transmit path, a microphone 10 is connected to a voice activity detector 100 which is in turn connected to an attenuator 110. An output of the attenuator 110 is connected to an input of the radio transceiver 30. A decision block 120 receives inputs from the voice activity detectors 100, 140 and produces outputs which are fed to the attenuators 110, 130.

In operation, an information signal received at the radio transceiver 30, corresponding to a voice signal transmitted by a far-end user in the communications system, is processed and broadcast to a near-end user of the mobile station via the loudspeaker 20. At the same time, sound picked up at the microphone 10 is processed and transmitted to the far-end user via the radio transceiver 30. The audio signal output by the microphone 10 may consist of several components. For example, it may contain a primary component, corresponding to speech of the near-end user of the mobile station, as well as secondary components which may include an echo signal, corresponding to sound output by the loudspeaker 20 and picked up by the microphone 10, and a noise signal, corresponding to ambient noise existing at the mobile station site. Where the mobile station is a mobile telephone located in an automobile, sources of ambient noise include traffic, movement by the near-end user, and movement of the microphone itself (e.g., when the microphone is attached to a sun visor).

As described above, echo signals can be extremely bothersome to users of a communications system. In fact, if echo signals are allowed to pass unattenuated between users of a communications system, the system may be virtually unusable in many real world applications. Therefore, conventional echo suppression circuitry, such as that depicted in FIG. 1, has been used to prevent echo signals from passing back and forth between users of a communications system. The configuration of FIG. 1 implements a well-known and straightforward approach to echo suppression in which the speech of only one user is transmitted at any given time. In other words, when the near-end user is speaking, the transmit path of the far-end user is attenuated or muted, and vice versa.

For example, when a voice signal from a far-end user is received at the radio transceiver 30 of FIG. 1, the voice activity detector 140 senses that the far-end user is speaking and indicates that fact to the decision block 120. The decision block 120 then controls the attenuator 110 to attenuate, or even mute, the audio signal output by the microphone 10, thereby preventing the near-end input from being transmitted to the far-end user. Similarly, an output of the voice activity detector 100 indicates whether or not the near-end user of the mobile station is speaking. If so, then the decision block 120 controls the attenuator 130 to attenuate, or mute, sound transmissions from the far-end user. In this way, neither the near-end user, nor the far-end user, hears a delayed echo of his or her own voice when speaking. However, the system of FIG. 1 may create abrupt transitions in transmitted signals and may unsettlingly cut off the speech of a far-end user when a near-end user inadvertently makes noise or simply intends to reassure the far-end user with a quick "OK". Therefore, the system of FIG. 1 may be unsatisfactory in many contexts.

Figure 2:
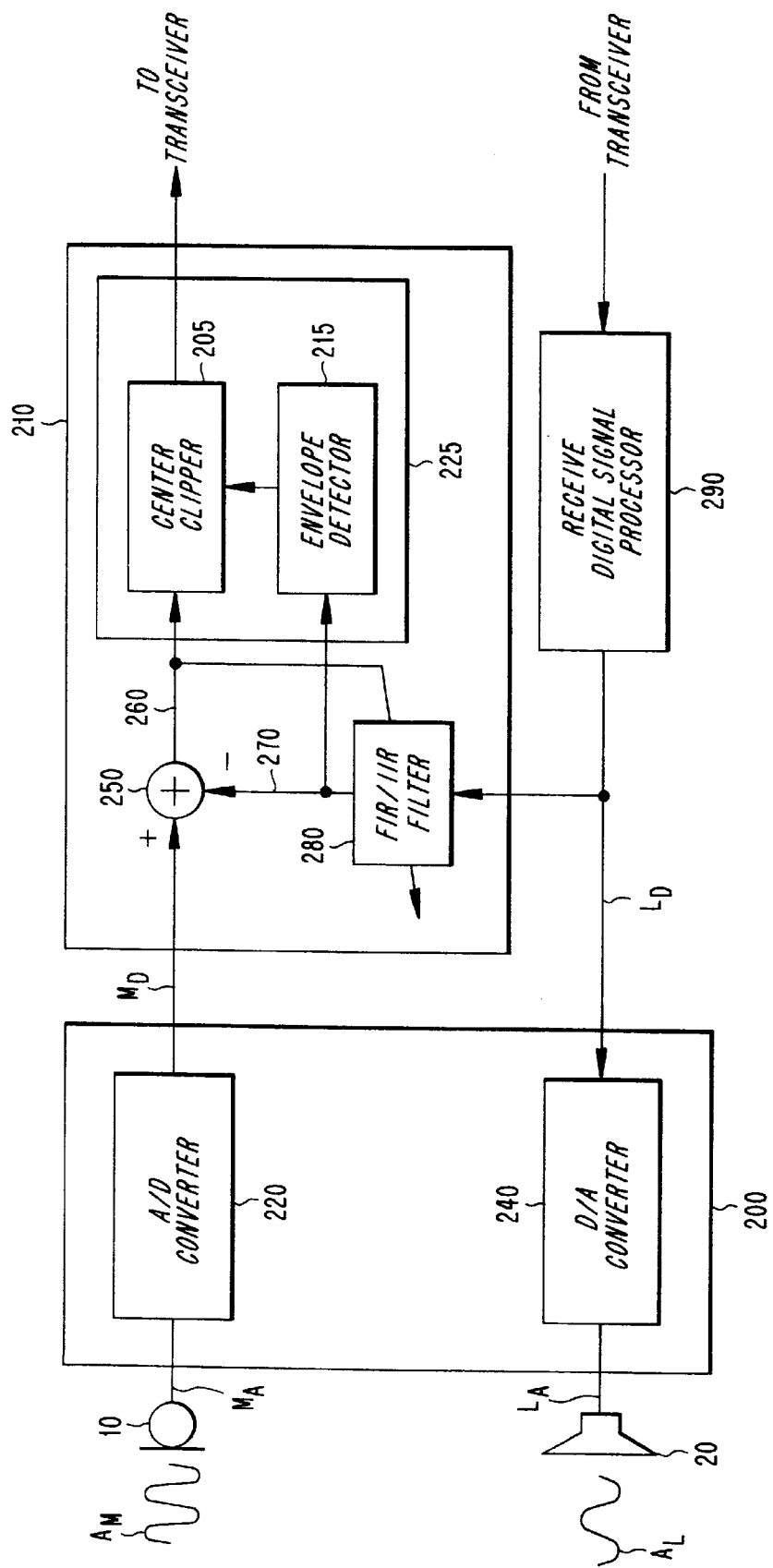
FIG. 2 depicts a conventional echo canceling system employing a digital filter and a residual echo suppression circuit.

To alleviate the problems associated with the conventional system of FIG. 1, more sophisticated echo suppression circuits have been developed. For example, FIG. 2 depicts an echo suppression circuit such as that disclosed in U.S. Pat. No. 5,475,731. As shown, an echo suppression circuit 210 includes an echo canceler, comprising a filter 280 and a summing device 250, as well as a residual echo suppressor 225, comprising a center clipper 205 and an envelope detector 215. As shown in FIG. 2, the echo suppression circuit 210 may be incorporated into a mobile station in a cellular radio communications system. In operation, a voice signal from a far-end user is received at a transceiver of the mobile station (not shown). Depending upon the type of transmission channel used, information signals received at the transceiver, and then passed to the circuitry of FIG. 2, may be analog or digital. In the circuit of FIG. 2, however, the mobile station transceiver output is assumed to be digital. As shown, a received signal is passed through an optional receive digital signal processor 290 to produce a digital loudspeaker signal $L_D$. The digital loudspeaker signal $L_D$ is then passed through a digital-to-analog converter 240 to produce an analog loudspeaker signal $L_A$. The analog loudspeaker signal $L_A$ is in turn used to drive the loudspeaker 20 to produce a loudspeaker audio signal $A_L$. At the same time, a near-end audio signal $A_M$ is picked up at the microphone 10 producing an analog microphone signal $M_A$.

The microphone audio signal $M_A$ is passed through an analog-to-digital converter 220 to produce a digital microphone signal $M_D$. As described above, the near-end audio signal $A_M$, as well as the digital microphone signal $M_D$, may comprise several signal components, including near-end voice, near-end noise, and far-end echo. The echo suppression circuit 210 is used to cancel the far-end echo component of the microphone signal $M_D$.

As shown in FIG. 2, the microphone signal $M_D$ is input to one node of the summing device 250. At the same time, the digital loudspeaker signal $L_D$ is fed through the filter 280, and an output 270 of the filter 280 is input to another node of the summing device 250. An output 260 of the summing device 250 is fed to the center clipper 205, and at the same time is fed back, as described below, to the filter 280. The output 270 of the filter 280 is also input to the envelope detector 215, and an output of the envelope detector 215 is input to the center clipper 205. An output of the center clipper 205 is passed to the mobile station transceiver (not shown). The filter 280 is a multiple-tap filter, as is well known in the art, having a transfer function, or impulse response, approximating that of a path from the loudspeaker 20 to the microphone 10. The true transfer function associated with the path from the loudspeaker 20 to the microphone 10 is a function of frequency and will depend upon, among other things, the relative physical placement of the loudspeaker 20 and the microphone 10, as well as the position of the near-end user of the mobile station. Thus, the transfer function of the filter 280 should be continually updated. Assuming that the transfer function of the filter 280 does represent a reasonable approximation of the true transfer function, then the output 270 of the filter 280 will represent a close approximation of the echo component of the microphone signal $M_D$. Therefore, the output 260 of the summing device 250 will represent an echo-canceled version of the microphone signal $M_D$. Assuming low near-end noise, and assuming that the near-end user is not speaking, the output 260 of the summing device 250 should then be zero whether or not the far-end user is speaking. Therefore, the output 260 of the summing device 250 is sometimes referred to in the art as an error signal. The error signal 260 may be used, as in known in the art, to update filter coefficients of the filter 280 such that the transfer function of the filter 280 represents a reasonable approximation of the true transfer function between the loudspeaker 20 and the microphone 10, even when the true transfer function is changing (e.g., due to movement of the near-end user).

Figure 3:
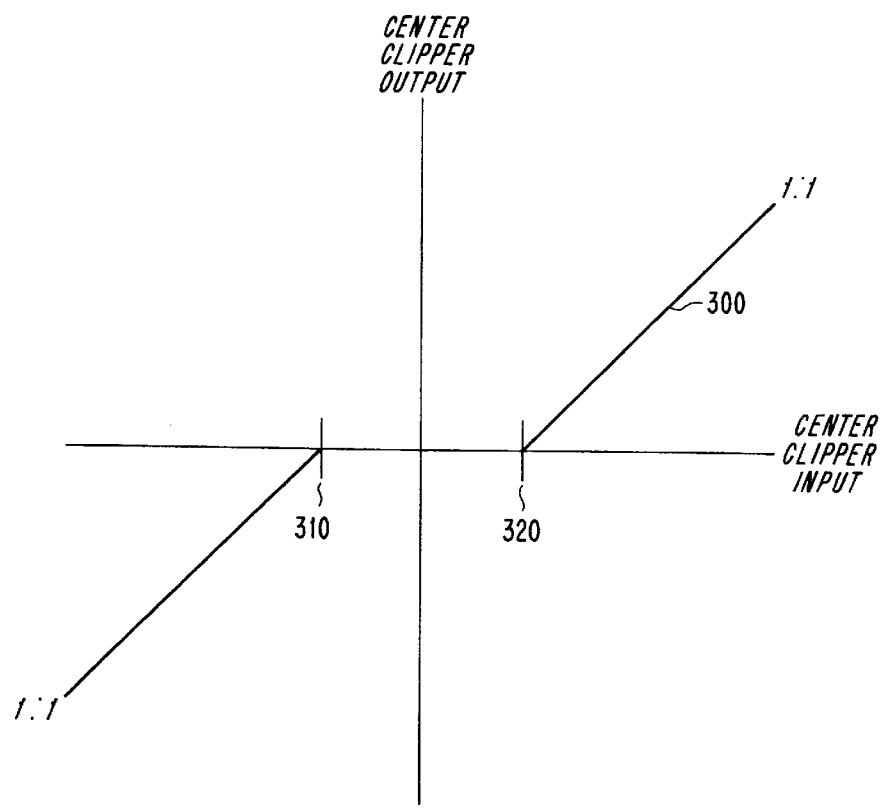
FIG. 3 depicts operation of a conventional center clipper employed, for example, in the system of FIG. 2.

The echo cancellation provided by the filter 280 and the summing device 250 may be insufficient in certain applications. For example, in practice the transfer function of the filter 280 may never fully converge to the true transfer function due to non-linearities in the loudspeaker 20 and other components which are used to process signals (e.g., signal converters, amplifiers, or transducers). Therefore, residual echo suppression, in addition to that provided by the filter 280 and the summing device 250, may be necessary. In the circuit of FIG. 2, residual echo suppression is provided by the center clipper 205 and the envelope detector 215, both of which are well known in the art. Operation of the center clipper 205 is depicted in FIG. 3 by an output-versus-input function 300. When the amplitude of the signal 260, which is input to the center clipper, lies within a clipping window defined by the clipping thresholds 310, 320, the output of the center clipper 205 remains zero. However, when the amplitude of the signal 260, which is input to the center clipper 205, exceeds the clipping thresholds 310, 320, the output of the center clipper 205 tracks the input of the center clipper 1-to-1. Thus, low-amplitude error signals are clipped, and residual echo suppression is achieved.

As shown in FIG. 2, the output 270 of the filter 280 is input to the envelope detector 215 and an output of the envelope detector 215 is in turn fed to the center clipper 205. The output of the envelope detector 215 is used to adjust the clipping thresholds 310, 320 of the center clipper 205 such that the center clipper is active only when the far-end user is speaking. In other words, the clipping thresholds 310, 320 are increased and decreased as the output of the filter 280 increases and decreases, respectively. This is necessary so that important low-amplitude components of the microphone signal $M_D$ are not suppressed when the near-end user is spealing and the far-end user is silent.

Note however, that the important low-amplitude portions of the near-end voice signal are suppressed, or clipped, when the near-end user and the far-end user are speaking simultaneously (i.e., during double-talk). Such low-amplitude clipping during double-talk may be unacceptable in many applications, and therefore conventional systems typically deactivate the residual echo suppression during double-talk. As described above, however, doing so may not be desirable. Note also that the residual echo suppression circuit 225 of FIG. 2 may fail should the residual echo signal be superimposed on other components of the microphone signal $M_D$. In other words, noise or near-end voice components of the microphone signal $M_D$ may cause the error signal 260 to have an amplitude which lies outside the clipping thresholds 310, 320 of the center clipper 205. If so, then the residual echo suppressing circuit 225 of FIG. 2 will be ineffective.

Advantageously, the present invention teaches methods and apparatus for suppressing noise and echo components in information signals, wherein the problems described above with respect to FIGS. 1, 2, and 3 are overcome. More particularly, the present invention teaches a center clipper having a clipping window with an adjustable window center. Such a center clipper may properly be referred to as an AC-center clipper, in that the clipping window of such a center clipper may be set to track a time-varying, or alternating-current (AC), input signal. Such an AC center clipper may be implemented, for example, by the following pseudocode:

--- ac_clip (AC-center clipper)
   ac_clip(input, delta, old_out) returns an
   AC-center clipped version of the input value.
     input = input value
     delta = +/– clipping threshold
       (i.e., ½ of clipping window)
     old_out = output from the last call to ac_clip
   The center of the clipping window starts at the
   initial value of the input signal and remains there,
   as does the output of the AC-center clipper, until
   the input signal moves outside the clipping window.
   At that time, the center of the clipping window,
   and the output of the AC-center clipper, are shifted
   to roughly track the amplitude of the input signal.

Figure 4:
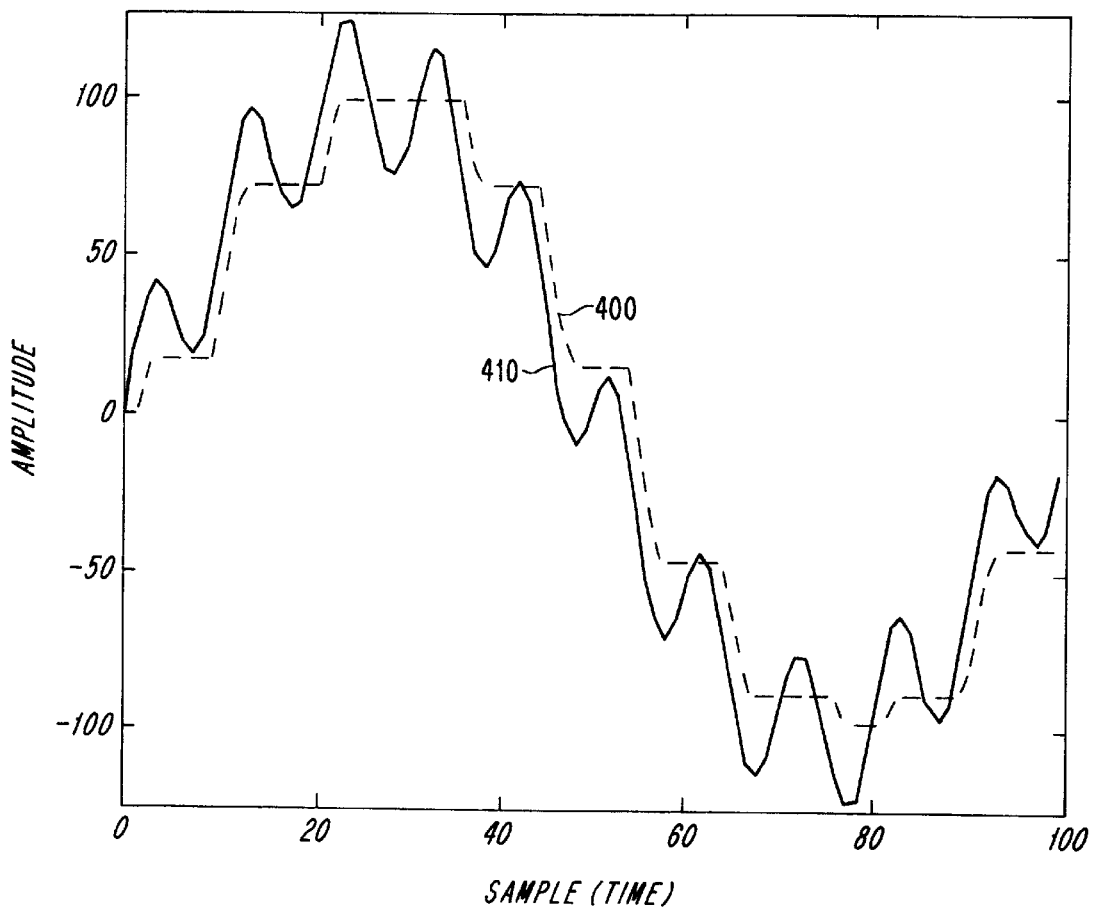
FIG. 4 depicts operation of an AC-center clipper constructed in accordance with the teachings of the present invention.

--- function new_out=ac_clip(input, delta, old_out)
  if old_out<input–delta
    new_out=input–delta;
  elseif old_out>input+delta
    new_out=input+delta;
  else
    new_out=old_out;
  end An example of the behavior of an AC-center clipper, as implemented using the above listed pseudocode to move the center of the clipping window, is depicted in FIG. 4. In FIG. 4, a solid line 410 represents an information signal comprising a summation of a first sinusoid having a period of 10 units and an amplitude of 25 units and a second sinusoid having a period of 100 units and an amplitude of 100 units. In the simulation depicted in FIG. 4, the clipping threshold of the AC-center clipper is fixed at 25 units. The information signal 410 may represent, for example, a microphone signal $M_D$ such as that depicted in FIG. 2. The first, low-frequency sinusoidal component of the information signal 410 may represent, for example, low-frequency noise or voice signals picked up at the microphone 10 of FIG. 2. The second, higher-frequency sinusoidal component of the information signal 410 may represent, for example, an echo signal generated by the loudspeaker 20 and picked up by the microphone 10 of FIG. 2.

In FIG. 4, a dashed line 400 represents an output of the AC-center clipper implemented using the above listed pseudocode. As shown, the high-amplitude, low-frequency component of the information signal passes through the AC-center clipper, while the low-amplitude, high-frequency component of the information signal is substantially suppressed by the AC-center clipper. Thus, an echo signal component "riding on top of" another signal component is easily attenuated by the AC-center clipper. As described below, this aspect of the AC-center clipper can be used advantageously, not only to suppress echo signals even in the presence of noise, but also to achieve residual echo suppression even during double-talk situations.

By way of contrast, a conventional center clipper such as that shown in FIG. 2 would fail to suppress the echo signal of FIG. 4 should the overall amplitude of the information signal 410 exceed the fixed-center clipping window of the conventional center clipper. Thus, in order to achieve the level of echo suppression depicted in FIG. 4, the clipping window of the conventional center clipper would have to be made large enough to capture both the echo signal and the low-frequency signal component. Doing so, however, would so severely distort the information signal that it would be bothersome, if not intolerable, from a far-end user perspective. As a result, a conventional center clipper cannot be used effectively, if it can be used at all, during ambient noise or double-talk situations.

Figure 5:
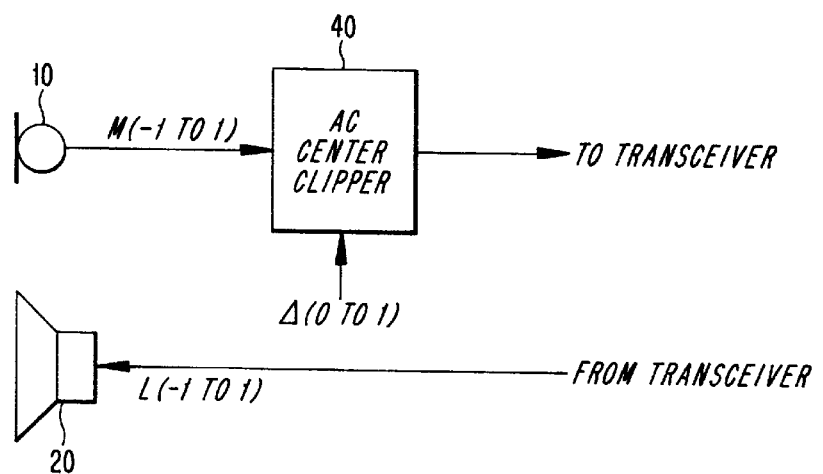
FIG. 5 depicts an exemplary embodiment of an echo suppression system constructed in accordance with the teachings of the present invention.

FIG. 5 depicts an AC-center clipper 40 used as a stand-alone noise and echo suppressor in a mobile station employed, for example, in a cellular radio communications system. As shown, output from a microphone 10 is input to the AC-center clipper 40, and an output of the AC-center clipper 40 is passed to a mobile station transceiver (not shown). A clipping threshold Δ of the AC-center clipper is set equal to a constant. Output from the mobile station transceiver, corresponding to voice signals received at the transceiver from a far-end user, is coupled to a loudspeaker 20. As shown in FIG. 5, a microphone signal M, output from the microphone 10, and a loudspeaker signal L, input to the loudspeaker 20, may be normalized to lie within a range of −1 to 1. Additionally, the clipping threshold Δ of the AC-center clipper 40 may also be normalized to a range of 0 to 1. It will be understood that the microphone signal M and the loudspeaker signal L may be digital or analog, as appropriate. The AC-center clipper 40 of FIG. 5 behaves as is described above with respect to FIG. 4, and thus provides utility as a stand-alone noise and echo suppressor. However, because the AC-center clipper may introduce some distortion, as shown in FIG. 4, it may be advantageous to reduce the effects of the AC-center clipper when a far-end user of the system of FIG. 5 is not speaking.

Figure 6:
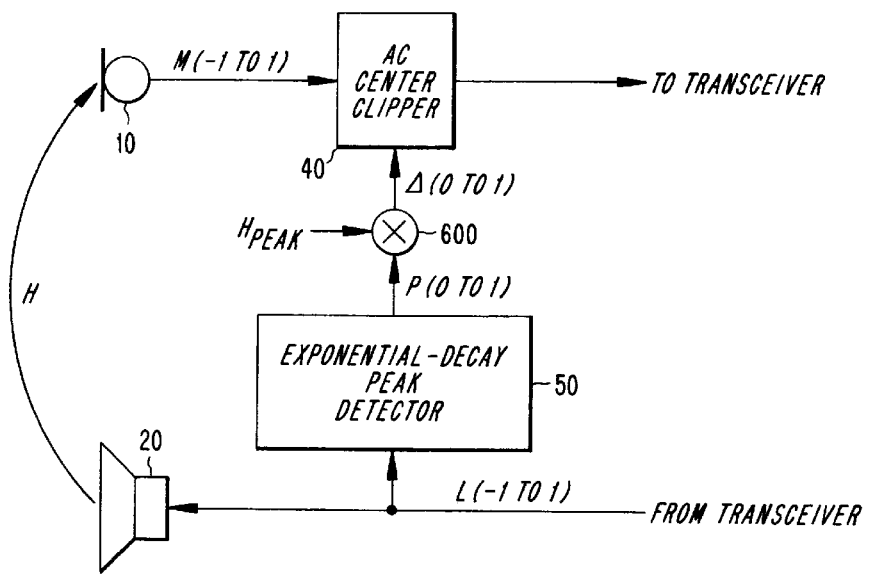
FIG. 6 depicts a second exemplary embodiment of an echo suppression system constructed in accordance with the teachings of the present invention.

Thus, FIG. 6 depicts an exemplary embodiment of the present invention in which an AC-center clipper, used to suppress noise and echo components of a near-end voice signal, is controlled in a manner which minimizes impact on a near-end speech signal. As shown, a microphone signal M output from a microphone 10 is input to an AC-center clipper 40. An output of the AC-center clipper 40 is coupled to a mobile station transceiver (not shown). A received signal L, output from the mobile station transceiver, is input to a loudspeaker 20. As in the system of FIG. 5, the microphone signal M and the loudspeaker signal L may be analog or digital, as appropriate, and may be normalized to a range of −1 to 1.

In FIG. 6, the loudspeaker signal L is input to an envelope detector 50 which may be constructed, for example, as an exponential-decay peak detector. A time constant of the detector 50 is set such that the decay rate of an output P of the detector 50 is no faster than the decay rate associated with an acoustic path between the loudspeaker 20 and the microphone 10. In other words, a peak in the detector output P, which is induced by a peak in the loudspeaker signal L, should fall off no faster than the corresponding echo signal (including reverberations) which is picked up at the microphone 10. The decay rate of the peak detector should not be made so slow, however, that near-end transmissions are significantly distorted. In FIG. 6, the detector output P, which may also be normalized to a range of 0 to 1, is coupled to a multiplier 600 where it is multiplied by a parameter $H_{peak}$, which is an estimator of the true transfer function H of the acoustic path from the loudspeaker 20 to the microphone 10. The transfer function estimator HpmK, as well as the time constant of the peak detector, may be preset based upon testing performed on experimental systems or, alternatively, may be set for each particular system during installation and calibration. An output Δ of the multiplier 600 is used as a clipping threshold for the AC-center clipper 40.

In operation, when a far-end user of the system of FIG. 6 is silent, the amplitude of the loudspeaker signal L will be zero, as will the output P of the envelope detector 50. Thus, the output Δ of the multiplier 600 will be zero and the AC-center clipper 40 will act as a pass-through, having no effect on the microphone signal M. Alternatively, when the far-end user is speaking, the loudspeaker signal L will be non-zero, as will the output P of the envelope detector 50. Therefore, the output Δ of the multiplier 600 will be non-zero, and the AC-center clipper 40 will behave as was described with respect to FIG. 4. In this way, the AC-center clipper 40 is active only when necessary. In other words, it is active only when the far-end user is speaking. As a result, the AC-center clipper 40 serves to suppress echo in a single-talk situation in which only the far-end user is speaking, but it does not distort the near-end voice signal in a single-talk situation in which only the near-end user is speaking. Note that any DC offset which may be present in the far-end signal, or which may be introduced during analog-to-digital conversion of the far-end signal, may be removed from the signal input to the envelope detector 50 (e.g., by AC-coupling or high-pass filtering, as appropriate) so that the clipping threshold of the AC-center clipper 40 is not made artificially, and unnecessarily, high.

During a double-talk situation, the AC-center clipper 40 is active due to the non-zero amplitude of the loudspeaker signal L. Therefore, in addition to suppressing echoes, the AC-center clipper 40 partially distorts the near-end voice signal. However, because the distortion introduced by the AC-center clipper 40 is slight compared to that which would be introduced by a conventional center clipper having a clipping window large enough to achieve echo suppression during double-talk, the AC-center clipper 40 of the present invention need not be turned off. As a result, the AC-center clipper 40 may serve as an effective technique for full-time echo suppression, even in the absence of a "true" echo canceler comprising an adaptive filter such as that shown in FIG. 2. By way of contrast, a conventional center clipper cannot be used as effectively, if it can be used at all, in a configuration such as that depicted in FIG. 6.

The configuration of FIG. 6 may be simulated, for example, using the following pseudocode, when used in conjunction with the previously listed pseudocode:

```
peak_det (peak detector)
    peak_det(input, pole, old_out) returns the peak
    magnitude of the input and the decayed previous
    output value. Thus, the output rises with the
    input, but falls off slowly after an input peak.
        input = input value
        pole = location in the Z-plane of a real pole
               in an IIR exponential-decay filter
               (note: 0 < pole < 1 for stability)
        old_out = output from the last call to peak_det function new_out=peak_det(input, pole, old_out)
    new_out=max(abs(input), pole * old_out);
```

```
echo_sup (echo suppressor)
    echo_sup(far_end, near_end, pole, Hpeak) returns
    an AC-center clipped version of the near_end signal.
    The clipping window threshold (or delta) is adjusted
    in accordance with an envelope of the far_end signal.
        far_end = far end user signal
        near_end = near end user signal
        pole = pole of peak detector
        Hpeak = acoustic path estimator function [clip, peak]
    =echo_sup(far_end, near_end, pole, Hpeak)
    if length (far_end)~=length(near_end)
        error('Vectors must be the same length.') end
    N=length(far_end);
    old_peak=0;
    old_clip=0;
    peak=zeros(1,N);
    clip=zeros(1,N);
    for i=1:N
        peak(i)=peak_det(far_end(i), pole, old_peak);
        old_peak=peak(i);
        clip(i)=ac_clip(near_end(i), Hpeak * peak(i), old_clip);
        old_clip=clip(i);
    end
```

Figure 8:
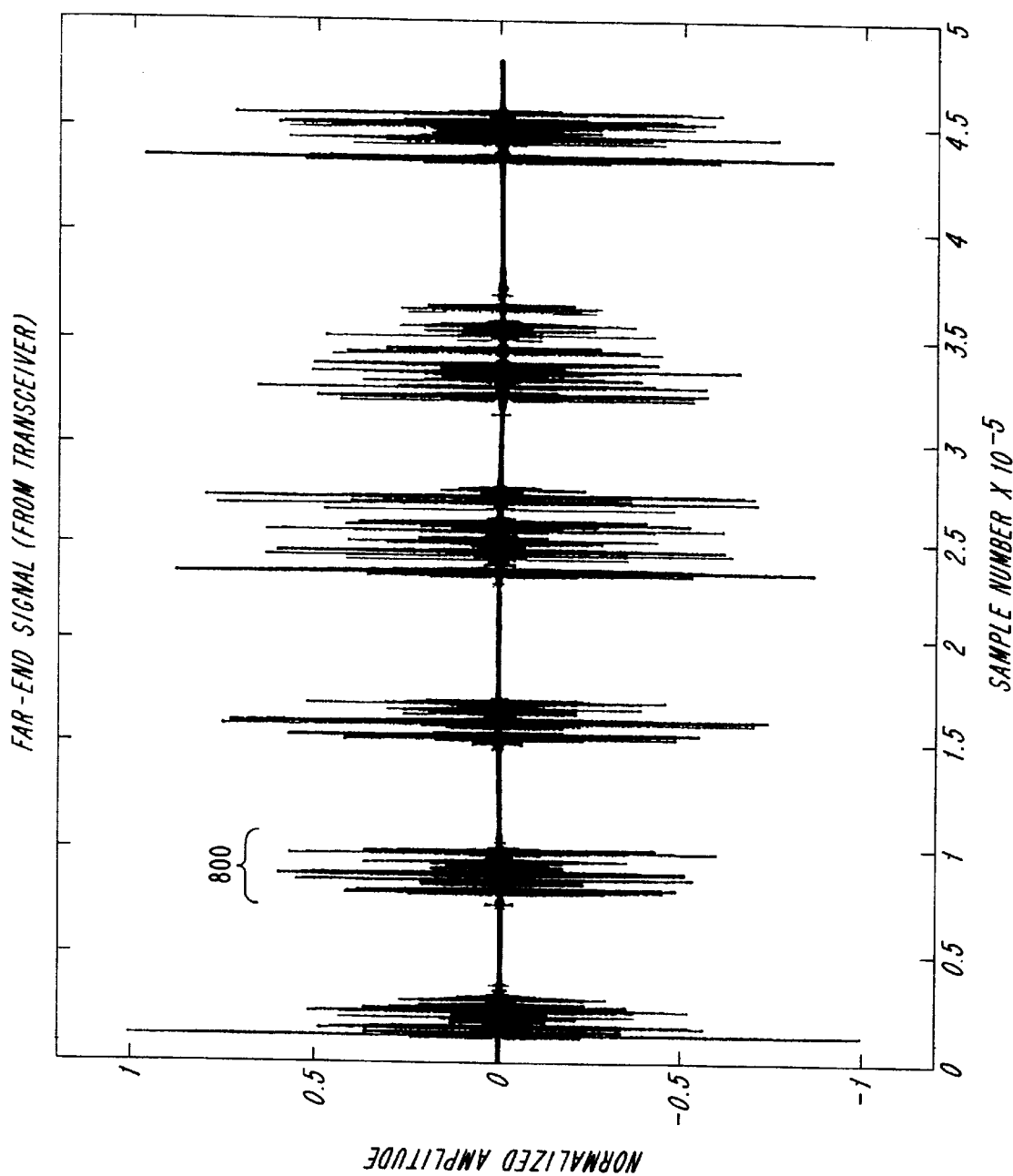
FIG. 8 depicts a far-end audio signal which may be received, for example, at a near-end mobile station transceiver employed in the embodiment of FIG. 6.

FIGS. 8–12 illustrate the performance of the AC-center clipper configuration of FIG. 6. FIG. 8 depicts an exemplary far-end voice signal which may be received, for example, at the mobile station transceiver of FIG. 6. As shown in FIG. 8, the far-end signal may comprise bursts of speech intermixed with periods of silence, corresponding to a far-end user alternately speaking and then waiting for a response from the near-end user. One such burst of far-end speech 800 is identified by a bracket in FIG. 8. The far-end signal of FIG. 8 would be output, for example, via the loudspeaker 20 of FIG. 6.

Figure 9:
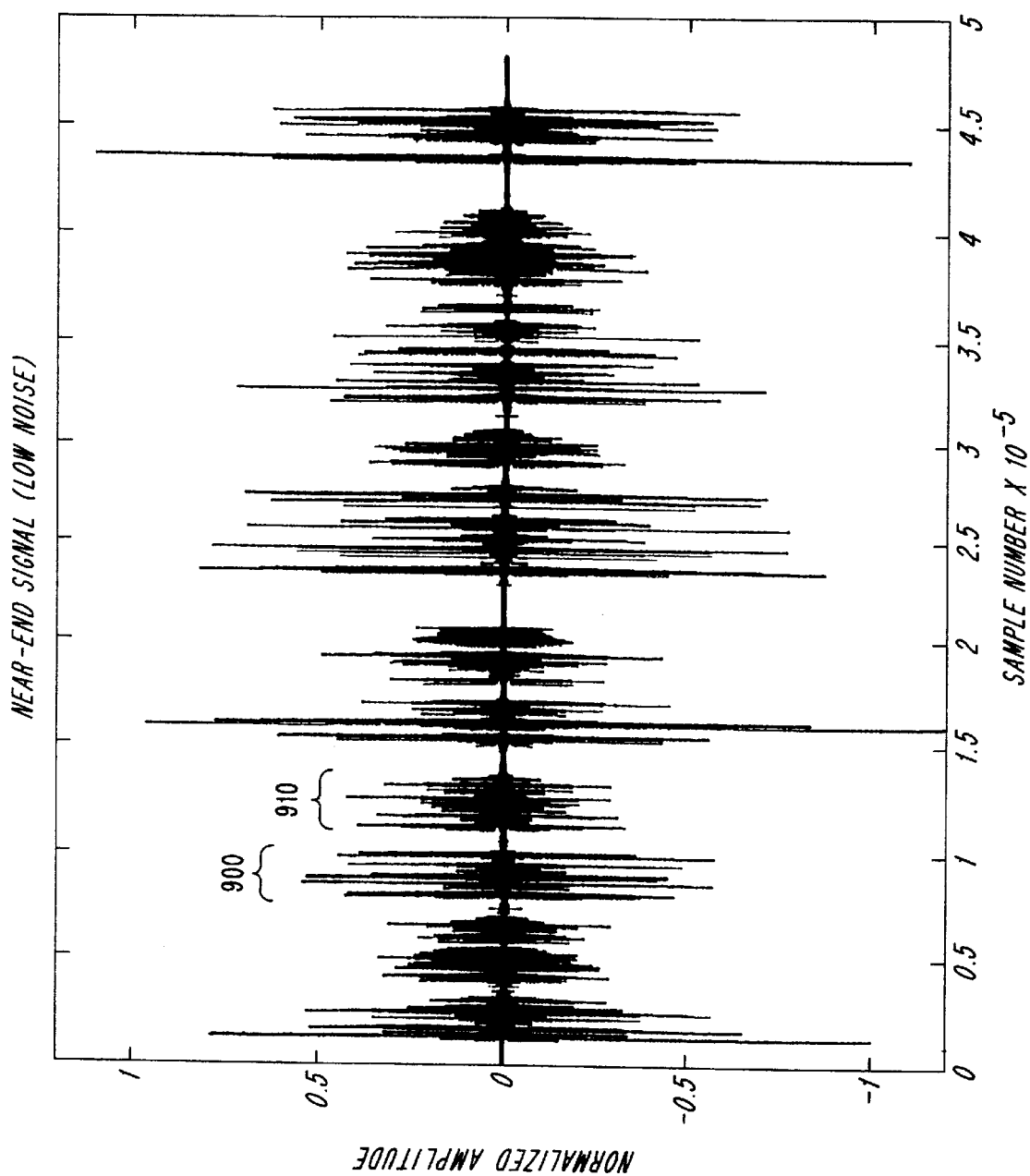
FIG. 9 depicts a near-end audio signal which may arise, for example, at an output of a microphone employed in the embodiment of FIG. 6.

FIG. 9 depicts a near-end signal which would arise, for example, at the output of the microphone 10 of FIG. 6. As shown in FIG. 9, the near-end signal may comprise alternating bursts of near-end and far-end speech. In FIG. 9, a far-end burst 900 and a near-end burst 910 are identified by brackets. The far-end burst 900 represents, for example, an echo signal component arising at the output of the microphone 10 of FIG. 6 due to output of the loudspeaker 20. The near-end burst 910 represents, for example, a near-end speech signal component arising at the output of the microphone 10 of FIG. 6 due to a near-end user speaking into the microphone 10.

Figure 10:
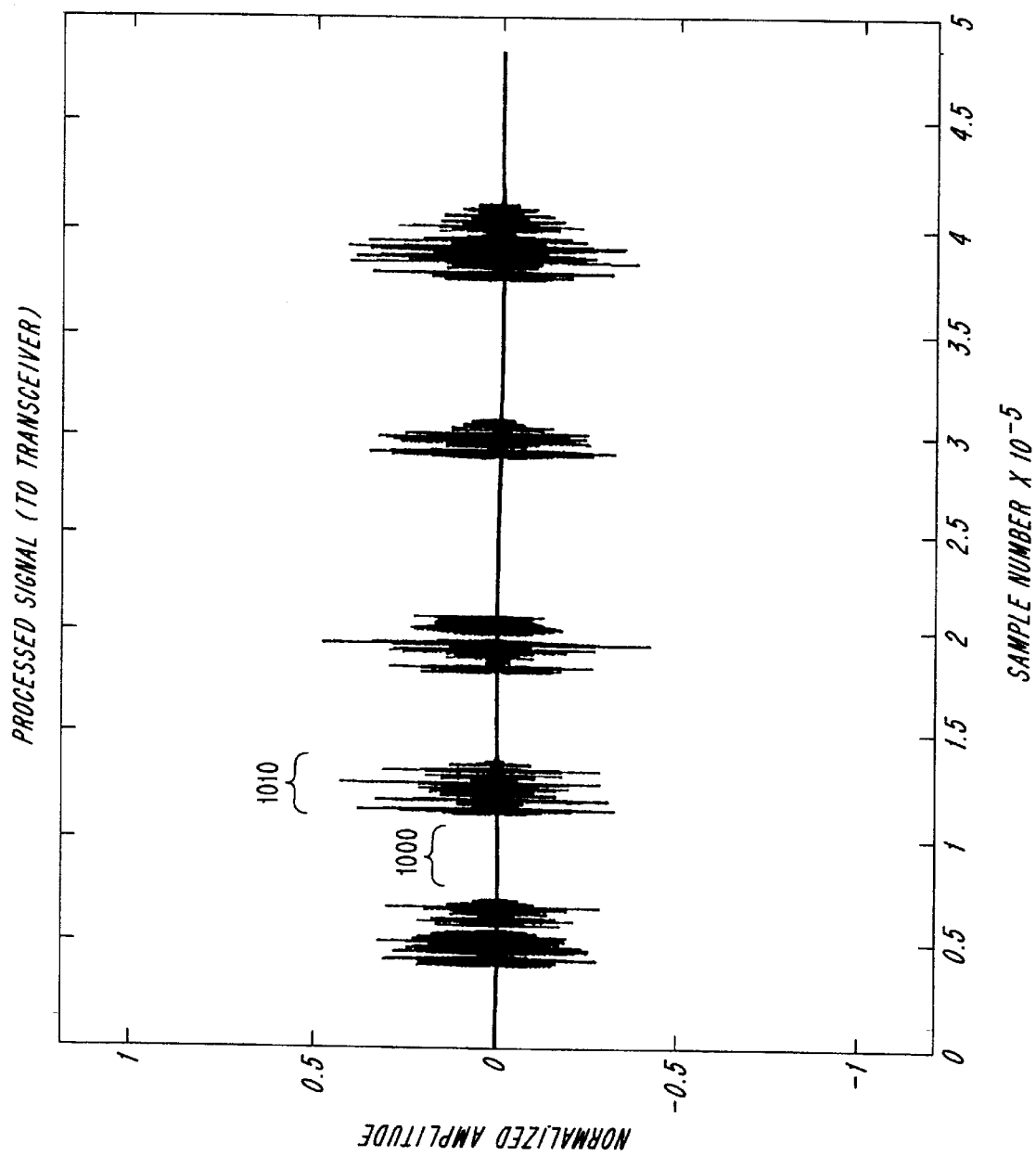
FIG. 10 depicts an output audio signal which may arise, for example, at an output of an AC-center clipper employed in the embodiment of FIG. 6.

FIG. 10 then depicts a processed signal corresponding, for example, to the output of the AC-center clipper 40 of FIG. 6. As shown, the processed signal may comprise bursts of near-end speech separated by periods of silence. A burst of near-end speech 1010 and a period of silence 1000 are identified by brackets in FIG. 10. The near-end burst 1010 corresponds to the near-end burst 910 of FIG. 9. The period of silence 1000 indicates that the far-end burst 900, present in the input to the AC-center clipper 40, has been suppressed. In other words, only the near-end voice bursts are allowed to pass to the far-end user, while the far-end bursts, or echoes, are suppressed. Note that FIGS. 8, 9 and 10 represent a situation in which there exists little near-end noise.

Figure 11:
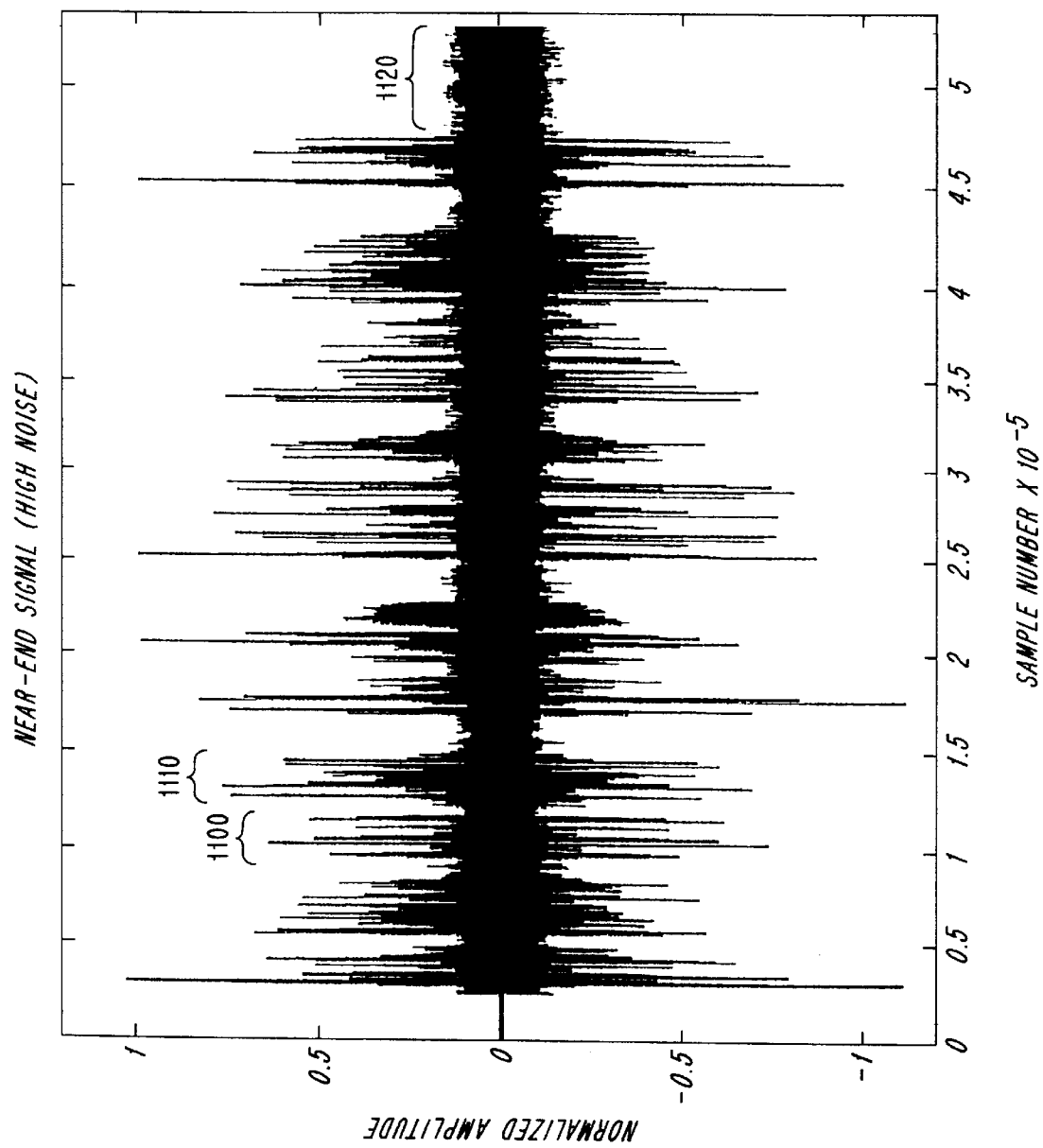
FIG. 11 depicts a noisy near-end audio signal which may arise, for example, at an output of a microphone employed in the embodiment of FIG. 6.
Figure 12:
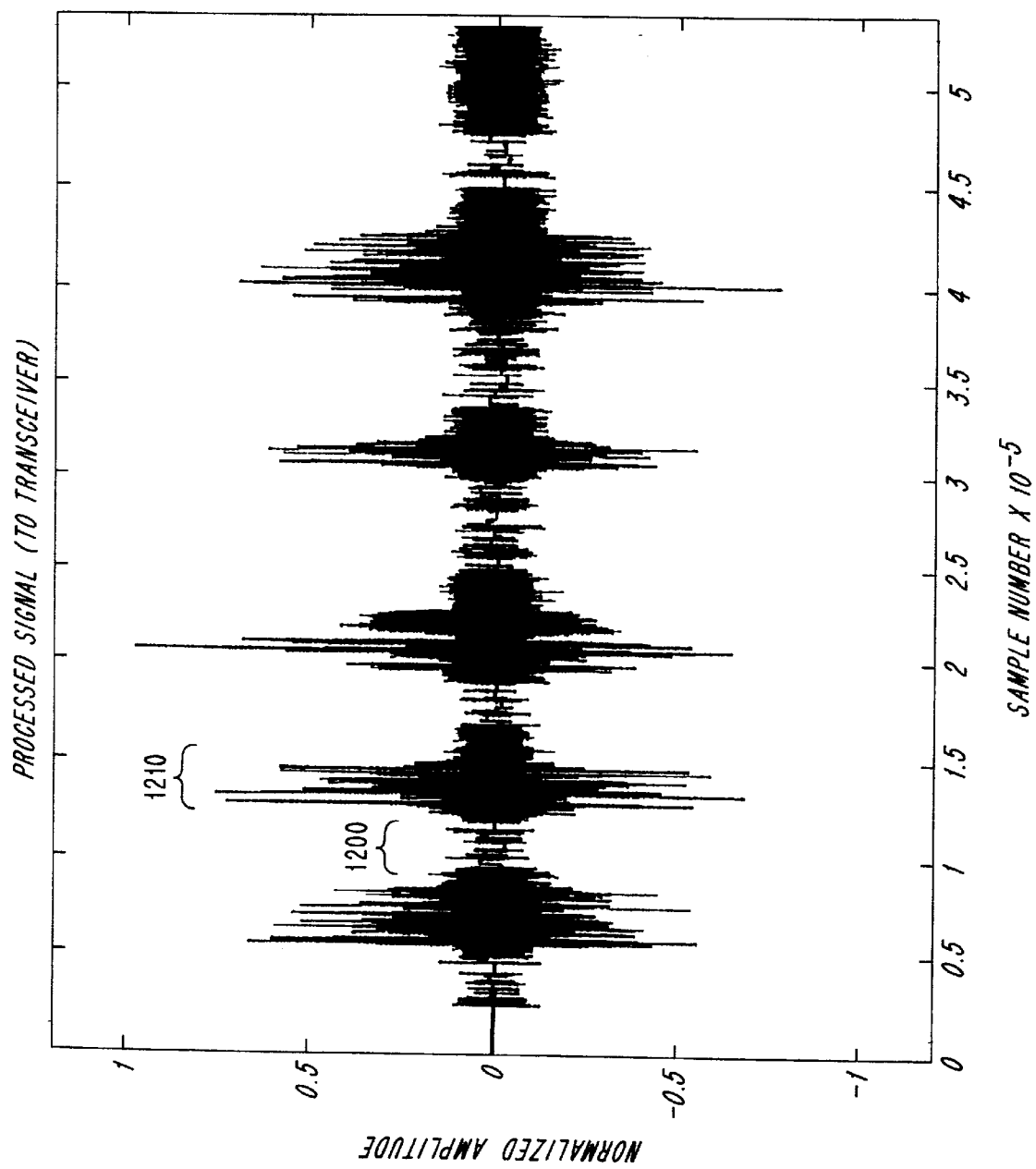
FIG. 12 depicts an output audio signal which may arise, for example, at an output of an AC-center clipper employed in the embodiment of FIG. 6.

FIGS. 11 and 12, by way of contrast, represent a situation in which there exists considerable near-end noise. As described above, such near-end noise may result, in the case of a mobile automobile telephone, from road noise or from physical movement by the near-end user. FIG. 11 depicts an exemplary near-end signal comprising alternating bursts of near-end and far-end speech, superimposed upon near-end noise. A far-end burst 1110, a near-end burst 1100, and a period of noise 1120 are identified in FIG. 11 by brackets. Assuming the near-end signal of FIG. 11 is fed into the AC-center clipper 40 of FIG. 6, FIG. 12 then depicts an exemplary output of the AC-center clipper 40. As shown, the AC-center clipper effectively suppresses echo components of the near-end signal even in the presence of significant near-end noise.

In the preceding discussion, it was assumed that the far-end signal was relatively noise free. Note, however, that if the far-end signal is noisy, then the envelope detector output, and thus the clipping threshold of the AC-center clipper, will generally be non-zero even when the far-end user is not speaking. As a result, the AC-center clipper will undesirably introduce a level of distortion on the near-end signal in near-end single-talk and no-talk situations. Therefore, the present invention teaches that it is advantageous in certain contexts to reduce the clipping threshold of the AC-center clipper by an amount proportional to the level of far-end noise. For example, in the embodiment of FIG. 6, the output of the envelope detector 50 can be used to provide an indicator of far-end noise which can be subtracted from the output of the multiplier 600 to provide the clipping threshold $\Delta$ for the AC-center clipper 40. The indicator of far-end noise can be derived from the output of the envelope detector 50, for example, by gradually increasing a noise-indicator variable from zero and capping it using the detector output so that it tracks the lower limit of the far-end signal-envelope. Such an approach is simulated, for example, using the following modification of the echo suppression pseudo-code provided above.

```
echo_sup (echo suppressor)
    echo_sup(far_end, near_end, pole, Hpeak) returns
    an AC-center clipped version of the near_end signal.
    The clipping window threshold (or delta) is adjusted
    in accordance with an envelope of the far_end signal
    and reduced by a level of noise in the far_end signal.
        far_end = far end user signal
        near end = near end user signal
        pole = pole of peak detector
        Hpeak = acoustic path estimator
        noise = indicator of far_end noise
        scale = multiplier used to increase noise indicator
        offset = offset used to increase noise indicator
    scale and offset are determined emperically and set to
    establish a desired rate of increase for the far_end
    noise indicator. The values shown below cause the
    noise indicator to rise from zero to 2^(-8) in about
    65536 samples and to double in about 65536 samples
    (65536 samples corresponds to about 8 seconds for an
    8 kHz sample rate). Note that the time constant is
    independent of the magnitude of the far_end noise.

function [clip, peak]
=echo_sup(far_end, near_end, pole, Hpeak)
if length(far_end)~=length(near_end)
    error('Vectors must be the same length.') end
N=length(far_end);
old_peak=0;
old_clip=0;
noise=0;
scale=1+1/65536;
offset=2^(-24);
peak=zeros(1,N);
clip=zeros(1,N);
for i=1:N
    peak(i)=peak_det(far_end(i), pole, old_peak);
    old_peak=peak(i);
    noise=noise * scale+offset;
    noise=min(noise, peak(i));
    threshold=Hpeak * (peak(i)-noise);
    clip(i)=ac_clip(near_end(i), threshold, old_clip);
    old_clip=clip(i); end
```

Note that when the clipping threshold of an AC-center clipper is adjusted based on a level of noise in the source signal (i.e., the echo-producing signal), then AC-center clipper circuits can be used effectively to provide network echo suppression in which both near-end and far-end echoes are suppressed. In other words, an AC-center clipper circuit can be used as shown in FIG. 6 to suppress far-end signal echo from the near-end signal, and an analogous AC-center clipper circuit can be used to suppress near-end signal echo from the far-end signal. For example, in an alternative embodiment, the loudspeaker signal L of FIG. 6 is passed through a second AC-center clipper (not shown) prior to being fed to the loudspeaker 20 and the envelope detector 50, and a second envelope detector (not shown) is used to provide a clipping threshold for the second AC-center clipper based on the output of the first AC-center clipper 40. Because the clipping threshold of the second AC-center clipper is reduced in proportion to a level of noise in the near-end signal in a manner analogous to that described above with respect to the first AC-center clipper 40, the far-end signal produced at the loudspeaker 20 is not unduly distorted, and the dual AC-center clipper circuits provide effective two-way (acoustic and network) echo suppression.

Figure 7:
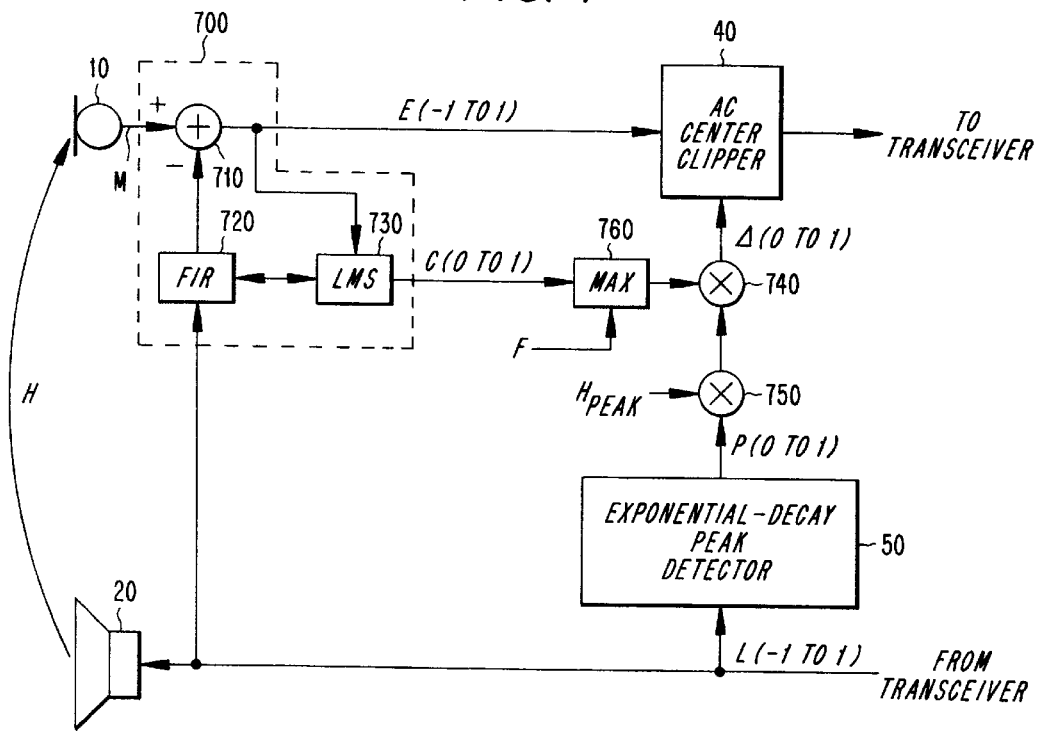
FIG. 7 depicts a third exemplary embodiment of an echo suppression system constructed in accordance with the teachings of the present invention.

While the configuration of FIG. 6 may be extremely useful in certain contexts, it may also be advantageous to combine the noise and echo suppression characteristics of the AC-center clipper of the present invention with a traditional echo canceler. FIG. 7 depicts an exemplary embodiment of such a combination. As shown, a loudspeaker signal L corresponding to a sound transmission received from a far-end user, is coupled to a loudspeaker 20. A microphone signal M arising at the output of a microphone 10 is coupled to an input of an echo canceler 700, and an output E of the echo canceler 700 is coupled to an input of an AC-center clipper 40. An output of the AC-center clipper 40 is coupled to a mobile station transceiver (not shown). The loudspeaker signal L is also coupled to a second input of the echo canceler 700 and to an input of an envelope detector 50. An output P of the envelope detector 50 is coupled to an input of a multiplier 750 where it is multiplied by an estimator H of the acoustic transfer function H between the loudspeaker 20 and the microphone 10 to produce an output which is in turn input to a second multiplier 740. A convergence output C of the echo canceler 700 is input to a MAX logic block 760. A parameter F is coupled to a second input of the MAX logic block 760 and an output of the MAX logic block 760 is input to the second multiplier 740. As shown, an output Δ of the second multiplier 740 is used as a clipping threshold for the AC-center clipper 40.

In operation, the echo canceler 700 behaves as is described above with respect to FIG. 2. In brief, the echo canceler 700 comprises a summing device 710, a filter 720, and a least-mean-square (LMS) logic block 730. The filter 720 is used to produce an estimator of the echo component of the microphone signal M. The estimator is then combined with the microphone signal M at the summing device 710 to produce an error signal E. Filter coefficients of the filter 720 are adjusted in time such that an impulse response of the filter 720 approximates the acoustic transfer function H existing between the loudspeaker 20 and the microphone 10. As is known in the art, the coefficients of filter 720 may be updated using the error signal E, in conjunction with an LMS algorithm, implemented for example in the LMS block 730.

Because the true transfer function H may change over time, for example due to changes in noise conditions at the near-end mobile station, the coefficients of filter 720 are continually updated. When the mobile station is first powered up, or when a relatively stable prevailing transfer function H changes abruptly, there will exist a finite period of time during which the transfer function of the filter 720 is a relatively poor approximation of the true transfer function H. However, as the filter coefficients are updated in response to the error signal E, the transfer function of the filter 720 will converge toward the true transfer function H. Thus, the echo canceler 700 is said to be converged or unconverged depending upon whether the transfer function of the filter 720 is, or is not, a good approximation of the true transfer function H, respectively.

As described in U.S. patent application Ser. No. 08/578,944, entitled "Gauging Convergence of Adaptive Filters" and filed Dec. 27, 1995, the LMS logic block 730 may be used to produce an output C indicating a relative level of convergence of the echo canceler 700. Though the echo canceler 700 of FIG. 7 is shown to be a traditional LMS-type echo canceler, other more sophisticated echo cancelers, as well as other devices for measuring the convergence of those echo cancelers, are contemplated by the present invention. See, for example, the above-mentioned U.S. patent application Ser. No. 08/578,944, which is incorporated herein by reference.

In the system of FIG. 7, the convergence output C of the echo canceler 700 is used to adjust the clipping threshold Δ of the AC-enter clipper 40 so that the AC-center clipper 40 serves as a residual echo suppressor and provides echo suppression above and beyond that provided by the echo canceler 700, as necessary. As described in more detail below, the effect of the AC-enter clipper 40 is maximized when the echo canceler 700 is unconverged, and is then reduced as the echo canceler 700 converges so that any distortion introduced by the AC-center clipper 40 is minimized. Recall, however, that since the echo canceler 700 may never fully converge due to non-linearities in the loudspeaker 20 and other signal processing components, it may be desirable to keep the AC-center clipper 40 active, at least to some degree, even when the echo canceler 700 is largely converged. Furthermore, as is described with respect to FIG. 6, the AC-center clipper 40 need not be entirely deactivated at any time, even during double-talk situations. Once again, this represents a significant advantage over conventional fixed-center center clippers.

As shown in FIG. 7, the convergence output C is input to the MAX logic block 760, as is a fixed parameter F. The convergence output C may be normalized to a range of 0 to 1, where 1 represents a completely unconverged state and 0 represents a fully converged state. The MAX logic block 760 then provides an output corresponding to either the convergence output C of the echo canceler 700 or the floor parameter F, whichever is greater. Thus, as is described further below, the parameter F serves as a "floor" for the clipping threshold of the AC-center clipper 40 and prevents the AC-center clipper 40 from being completely deactivated even when the echo canceler 700 is largely converged. The parameter F is set in practice to yield a desired minimum AC-center clipper effect. Note that although the parameter F is shown as a fixed constant in FIG. 7, it may be adjusted dynamically based upon prevailing system conditions.

As shown, the output of the MAX logic block 760 of FIG. 7 is multiplied at the second multiplier 740 by the output of the first multiplier 750. The first multiplier 750, the envelope detector 50, and the parameter $H_{PEAK}$ operate as is described above with respect to FIG. 6. Therefore, the output Δ of the second multiplier 740 represents a combination of the state of convergence of the echo canceler 700 and the level of input being received from the far-end user. Because the output Δ of the multiplier 740 is used as the clipping threshold for the AC-center clipper 40, the effect of the AC-center clipper 40 is continually adjusted to an appropriate level.

For example, if the echo canceler 700 is completely unconverged (i.e., if the convergence output C is 1), then the output of the MAX logic block 760 is 1, the clipping threshold Δ is equal to the output of the first multiplier 750, and the effect of the AC-center clipper is maximized. As is described with respect to FIG. 6, however, the output of the first multiplier 750 is non-zero only when the far-end signal is non-zero. When the echo canceler 700 converges (i.e., when the convergence output C drops from 1 toward 0), the output of the MAX logic block 760 tracks the convergence output C and drops below 1 so that the effect of the AC-center clipper 40 is diminished. When the echo canceler 700 becomes highly converged (i.e., as the convergence output C approaches 0), the output of the MAX logic block 760 equals floor parameter F, and the effect of the AC-center clipper 40 is at a minimum. Assuming, however, that the floor parameter F is non-zero, the AC-center clipper 40 will continue to operate as a residual echo and noise suppressor as desired.

Note that FIG. 7 depicts but one useful configuration. Other combinations of the parameters C, F, $H_{PEAK}$, P, which are used to produce the clipping threshold Δ, as well as other techniques for producing the parameters C, F, $H_{PEAK}$, P themselves, are possible and contemplated herein. Accordingly, those skilled in the art will appreciate that the present invention is not limited to the specific exemplary embodiments which have been described herein for purposes of illustration. The scope of the invention is defined by the claims which are appended hereto, rather than the foregoing description, and all equivalents which are consistent with the meaning of the claims are intended to be embraced therein.

What is claimed is:

1. A signal processing device, comprising:
    an input node for receiving an input signal; and
    a signal processor connected to said input node for processing the input signal to produce an output signal, wherein the output signal is produced by center clipping the input signal using a clipping window having a variable center.

2. The device of claim 1, wherein the variable center of the clipping window varies in accordance with a value of the input signal.

3. The device of claim 1, wherein the clipping window includes a fixed clipping threshold.

4. The device of claim 1, wherein the clipping window includes a variable clipping threshold.

5. The device of claim 4, wherein the variable clipping threshold varies in accordance with a value of a component of the input signal which is to be suppressed in the output signal.

6. The device of claim 1, wherein the clipping window includes an upper clipping threshold and a lower clipping threshold, wherein the upper and lower clipping thresholds are set independently of one another.

7. The device of claim 6, wherein the upper and lower clipping thresholds vary in accordance with at least one component of the input signal which is to be suppressed in the output signal.

8. The device of claim 1, wherein said signal processor is implemented in real time using a digital signal processing integrated circuit.

9. The device of claim 1, wherein said signal processor is implemented in software using a computer.

10. The device of claim 1, wherein said signal processor is implemented in real time using an analog circuit.

11. A method of processing an information signal, comprising the steps of:
    center clipping the information signal using a clipping window having an adjustable center; and
    adjusting the center of the clipping window in accordance with a value of the information signal.

12. The method of claim 11, wherein the information signal is a speech signal in a bidirectional communications system.

13. The method of claim 11, wherein the information signal is a speech signal input at a mobile station in a cellular radio system.

14. The method of claim 11, comprising the additional step of adjusting a clipping threshold of the clipping window in accordance with a value of a component of the information signal.

15. The method of claim 14, wherein the information signal is a speech signal in a bidirectional communications system, and wherein the component of the information signal used to adjust the clipping threshold is an echo signal.

16. A method of processing an input signal to produce an output signal in which a signal component present in the input signal is substantially suppressed, comprising the steps of:

receiving the input signal;

center clipping the input signal to produce the output signal using a clipping window having a variable center and a variable clipping threshold;

adjusting the center of the clipping window in time and in accordance with a value of the input signal;

adjusting the clipping threshold in time and in accordance with a value of the signal component present in the input signal; and outputting the output signal.

17. The method of claim 16, wherein said step of adjusting the clipping threshold includes the steps of:

feeding a source of the signal component present in the input signal to an input of a peak detector; and using an output of the peak detector as a basis for adjusting the clipping threshold.

18. The method of claim 16, wherein the input signal is a speech signal in a bi-directional communications system, and wherein the signal component present in the input signal is an echo signal.

19. A mobile station, comprising:

an input for receiving at least an information signal; and a center clipper for processing the information signal, wherein a clipping window of the center clipper includes an adjustable center.

20. The mobile station of claim 19, wherein the adjustable center of the clipping window is varied in accordance with a value of the information signal being processed.

21. The mobile station of claim 19, wherein the clipping window includes an adjustable clipping threshold, and wherein the clipping threshold is varied in accordance with a value of a disruptive component of the information signal being processed in order to substantially suppress the disruptive component.

22. An echo and noise suppressing device for processing an input signal, the input signal including a time-varying primary component and a time-varying secondary component, to produce an output signal in which the time-varying secondary component is substantially suppressed, comprising:

an input node for receiving the input signal;

a center clipper connected to said input node for processing the input signal to produce the output signal, wherein said center clipper includes a clipping window having a variable center and a clipping threshold set to attenuate the secondary component of the input signal; and an output node connected to said center clipper for outputting the output signal.

23. The device of claim 22, wherein the variable center of the clipping window is adjusted in accordance with a value of the input signal.

24. The device of claim 22, wherein the clipping window includes a fixed clipping threshold.

25. The device of claim 22, wherein the clipping threshold of said center clipper is variable and adjusted in accordance with a value of a source of the secondary component of the input signal.

26. The device of claim 22, further comprising an envelope detector disposed between a source of the secondary component of the input signal and said center clipper, wherein an output of the envelope detector is proportional to a value of the source of the secondary component, and wherein the output of the envelope detector is used to adjust the clipping threshold of said center clipper.

27. The device of claim 26, wherein said envelope detector is an exponential-decay peak detector.

28. The device of claim 27, wherein said exponential-decay peak detector is realized as an infinite impulse response digital filter having a pole of about 255/256.

29. The device of claim 26, further comprising a multiplier disposed between said envelope detector and said center clipper, wherein the output of the envelope detector is multiplied by an estimator of an effective transfer function of a path from the source of the secondary component of the input signal to said input node, and wherein an output of said multiplier is used to adjust the clipping threshold of said center clipper.

30. The device of claim 29, wherein the estimator is set equal to a constant, and wherein the constant is about 2.

31. The device of claim 22, wherein said input node is connected to an output of a microphone of a mobile station in a communications system, wherein said output node is connected to a transceiver of the mobile station, wherein the primary component of the input signal is a voice signal generated by a near-end user of the mobile station speaking into the microphone, and wherein the secondary component of the input signal is an echo signal generated by a loudspeaker of the mobile station broadcasting a voice signal generated by a far-end user of the mobile station.

32. A method for processing an input signal, the input signal including a time-varying primary component and a time-varying secondary component, to produce an output signal in which the time-varying secondary component is substantially suppressed, comprising the steps of:

receiving the input signal;

center clipping the input signal to produce the output signal using a clipping window having a variable center and a clipping threshold set to suppress the secondary component of the input signal;

adjusting the center of the clipping window in time based upon a value of the input signal; and outputting the output signal.

33. The method of claim 32, further comprising the steps of:

sensing a value of a source of the secondary component of the input signal; and adjusting the clipping threshold of the clipping window in time based upon a result of said sensing step.

34. A mobile station in a communications system, comprising:

a microphone for receiving near-end audio input at the mobile station and for producing a near-end audio signal which is to be transmitted to a far-end user in the communications system;

a loudspeaker for broadcasting, to a near-end user of the mobile station, a far-end audio signal which is generated by the far-end user and which is received at the mobile station; and an echo suppression circuit for attenuating an echo component of the near-end audio signal which results from the microphone receiving output from the loudspeaker, wherein said echo suppression circuit includes a center clipper having a clipping window with an adjustable clipping center.

35. The mobile station of claim 34, wherein the adjustable clipping center is adjusted based upon a value of the near-end audio signal.

36. The mobile station of claim 34, wherein a variable clipping threshold of the center clipper is adjusted based upon a value of the far-end audio signal.

37. The mobile station of claim 36, wherein the echo suppression circuit includes a peak detector receiving the far-end audio signal and producing an output which is proportional to a value of the far-end audio signal, and wherein the clipping threshold of the center clipper is adjusted based upon the output of the peak detector.

38. The method of claim 17, wherein the step of adjusting the clipping threshold includes the step of using, as an additional basis for adjusting the clipping threshold, a value indicating a level of noise in the source of the signal component present in the input signal.

39. The mobile station of claim 21, wherein the clipping threshold is reduced by a value indicating a level of noise in a source of the disruptive component of the information signal.

40. The device of claim 25, wherein the clipping threshold is reduced by a value indicating a level of noise in the source of the secondary component of the input signal.

41. The device of claim 26, wherein the output of the envelope detector is used to produce a noise value indicating a level of noise in the source of the secondary component of the input signal, and wherein the clipping threshold is reduced by an amount proportional to said noise value.

* * * * *